Patented Aug. 23, 1938

2,128,182

UNITED STATES PATENT OFFICE 2,128,182

METHOD OF PURIFYING TETRAPHOSPHORIC ACID

Augustus H. Fiske, Warren, R. I., assignor to Rumford Chemical Works, Rumford, R. I., a corporation of Rhode Island No Drawing. Application May 11, 1937, Serial No. 142,053

2 Claims. (Cl. 23—165)

In my previous Patents Nos. 2,019,665 and 2,019,666 relating to the production of tetraphosphates for water softening and allied uses, I had occasion to refer to tetraphosphoric acid and its salts and their history in the art.

The formula assigned to this acid by Rakuzin and Arseneev in their Chemistry (1923) was $H_6P_4O_{13}$, and this I believe is correct for tetraphosphoric acid in a pure form as produced by the laboratory methods used by them and by Fleitmann and Henneberg in 1848.

Commercial tetraphosphoric acid has been recently made available and has been supposed to have the above formula. It is a thick syrup, and, until the research on which my previous patents were based, had no apparent utility, it being merely incidental or a by-product to the manufacture of certain forms of phosphorous. The present commercial tetraphosphoric acid appears to have been produced after the directions given by Rakuzin and Arseneev by dissolving $P_2O_5$ in water and probably without the ageing feature of their process.

My present invention relates to a process of manufacturing pure tetraphosphoric acid, or the process or step of purification of such commercial tetraphosphoric acid. As I shall later show, my pure tetraphosphoric acid is a complete novelty, at least when viewed as a commercial product, and I so claim it.

For many purposes in which I contemplated the use of a 100% pure tetraphosphoric acid, or one so nearly so as to be resultantly equivalent, the matter of purity on a practical or commercial basis was paramount.

In my research looking to the production of such a pure or substantially pure tetraphosphoric acid, I passed $P_2O_5$ into water, as taught by Razukin and Arseneev, but realized that I could not make such acid conveniently or commercially if I had to wait several months for it to crystallize out as was done in their laboratory experiments with it.

In my experiments I found that without such crystallization I could obtain a syrup which gave a perfectly correct analysis for tetraphosphoric acid ($H_6P_4O_{13}$) but on subsequent testing for impurities I found that it contained 17% of pyrophosphoric acid ($H_4P_2O_7$).

I therefore conceived of a conversion of the pyrophosphoric acid content without substantial loss so that by a simple processing I could attain tetraphosphoric acid of a purity of 100% or practically so.

As is well known, phosphorus is formed in the furnace from tricalcium phosphate $Ca_3(PO_4)_2$ by reduction with carbon and silica. The reaction is $$2Ca_3(PO_4)_2 + 10C + 6SiO_2 = 6CaSiO_3 + 4P + 10CO$$

The phosphorus is then burned to $P_2O_5$ the reaction being $4P + 5O_2 = 2P_2O_5$.

The process for preparing tetraphosphoric acid is as follows:

Water in a vessel has $P_2O_5$ vapor passed into it and sometimes it is well to start the absorption with orthophosphoric acid. The first reaction after the $P_2O_5$ combines with the water is as follows:

$$3H_2O + P_2O_5 = 2H_3PO_4 \text{ (ortho-phosphoric acid)}$$

Sometimes the $P_2O_5$ tends not to combine with the water but bubbles up through it as a smoke and to get it started mechanically it is desirable to add phosphoric acid to the water at the start. The next reaction would be $$4H_3PO_4 + P_2O_5 = 3H_4P_2O_7 \text{ (pyro-phosphoric acid)}$$

Continuing to run $P_2O_5$ into the mixture a further reaction takes place as follows:

$$3H_4P_2O_7 + P_2O_5 = 2H_6P_4O_{13}$$
(tetra phosphoric acid)

This last reaction does not run to a complete end and when sufficient $P_2O_5$ to form $H_6P_4O_{13}$ has been added there is still some $H_4P_2O_7$ left in the syrup, for the material is in the form of a syrup. If I continued to add more $P_2O_5$ I will have more than the required amount to form the $H_6P_4O_{13}$. Therefore, I stop the reaction at this point when the equilibrium is reached which contains approximately 17½% of $H_4P_2O_7$ and 82½% of $H_6P_4O_{13}$. This is approximately the composition of the commercial so-called "pure" tetraphosphoric acid.

It is evident that the reaction for the preparation of tetraphosphoric acid by passing $P_2O_5$ into water is as follows: $2P_2O_5 + 3H_2O = H_6P_4O_{13}$, but if the proportion of water is not correct, the following reaction will have taken place $$P_2O_5 + 2H_2O = H_4P_2O_7$$

It will be seen, therefore, that in the passing of the $P_2O_5$ into the water, an equilibrium is evidently formed when the $P_2O_5$ reacts with the water and we have this mixture of pyrophosphoric acid and tetraphosphoric acid. Following this theory I tried experiments in which I kept the water in excess and ran similar tests, keeping the $P_2O_5$ in excess during the process of the reaction, but found in each case on test for impurity my resultant acid contained pyrophosphoric acid in large amount.

I then reached my concept of a procedure to convert the mixture into pure tetraphosphoric acid, and I have discovered that by heating to 450°–550° C. or 842°–932° F., I am able to convert my mixture of pyrophosphoric acid and tetraphosphoric acid into a material of 100% tetraphosphoric acid.

The amount of time the material is heated depends on the amount of material and the shape of the vessel containing it. A large amount would require several hours in a furnace, and under any circumstances it should be spread out in a fairly broad shallow layer. In a small amount of 20 or 30 grams, it has been my habit to use a small porcelain dish and the reaction takes from five to ten minutes. As the pyrophosphoric acid impurity amounts to about 17½%, in 200 grams of the impure tetraphosphoric acid there is approximately 35 grams of the impurity. When this 200 grams is heated to from 450° C. to 550° C., the yield of pure tetraphosphoric acid is 198.23 or approximately 198¼ grams. This represents the elimination of one molecule of water from every two molecules of the pyrophosphoric acid and its change into tetraphosphoric acid.

The chemical reaction for my process which purifies the tetraphosphoric acid is as follows:

$$2H_4P_2O_7 = H_6P_4O_{13} + H_2O$$

In this I drive off one molecule of water from the pyrophosphoric acid impurity, converting the material entirely into tetraphosphoric acid.

Whatever remainder there is of the pyro or other non-tetraphosphoric content is so nearly merged that in any subsequent reaction, as in forming an acid salt, the equation seems to clear itself and leave the absolutely pure tetraphosphoric acid, as far as we yet know it.

The reaction for the purification of the tetraphosphoric acid from its impurity by heating as I have already described is the removal of water from the pyrophosphoric acid impurity, this causing it to form tetraphosphoric acid. The reaction as noted is $$2H_4P_2O_7 + (heat) = H_6P_4O_{13} + H_2O$$

the graphic formula for which is:

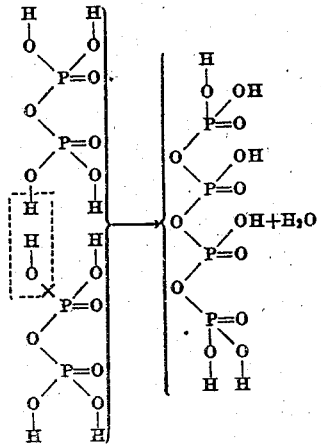

I have a good experimental basis for these formulas because I have proven that the tetraphosphate radical goes easily to the pyro, but not so easily to the ortho, and not at all to the meta, by hydrolysis. Boiling with either strong acid or alkali will cause it to decompose into the pyro and then ortho, but the pyro is formed first and the ortho by further chemical action.

By controlling the temperature, the rate of reaction in the pyrophosphoric impurity may be so gauged that a tetraphosphoric acid is produced which is 100% pure or practically so. It is obtainable as a syrup which is 100% $H_6P_4O_{13}$ which is the pure tetraphosphoric acid itself and does not need any crystallizing out as Rakuzin and Arseneev suggested.

What I therefore claim and desire to secure by Letters Patent is:

1. The process of purifying tetraphosphoric acid containing pyrophosphoric acid as an impurity, which comprises heating the impure tetraphosphoric acid to a temperature approximately between 450° C. and 550° C. for a sufficient length of time to eliminate water in the proportion of one molecule of water from every two molecules of the pyrophosphoric acid and thereby to convert the same into tetraphosphoric acid.

2. In the process of purifying tetraphosphoric acid containing pyrophosphoric acid as an impurity, that step which consists in changing the pyrophosphoric acid to tetraphosphoric acid by heating the same to a temperature and for a sufficient length of time to eliminate water in the proportion of one molecule of water from every two molecules of the pyrophosphoric acid.

AUGUSTUS H. FISKE.